No. 877,255. PATENTED JAN. 21, 1908.
C. B. TARBELL.
EXTENSIBLE WATER TOWER OR STAND PIPE.
APPLICATION FILED JULY 27, 1906.
2 SHEETS—SHEET 2.
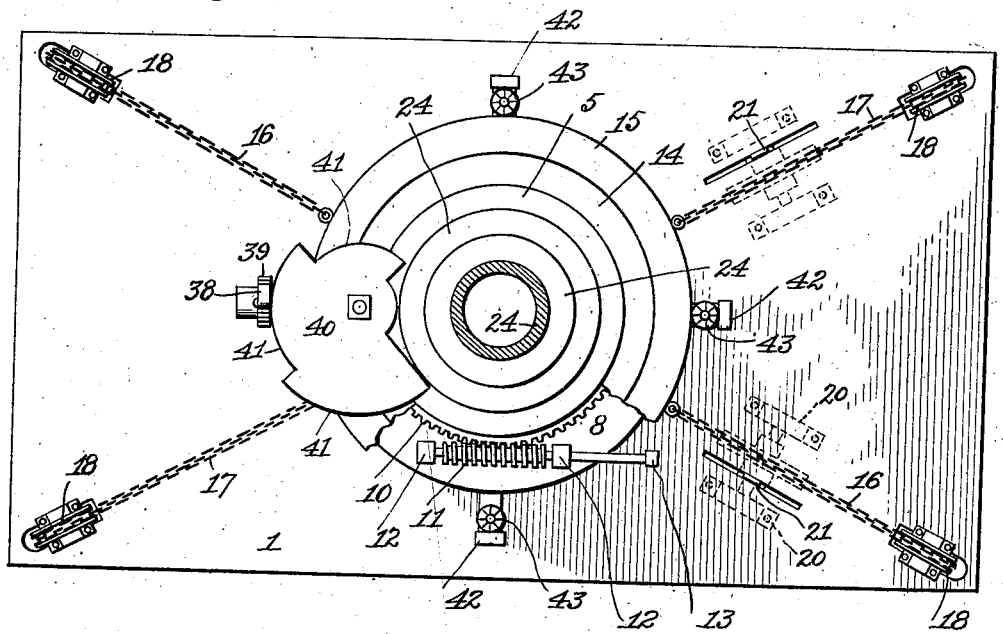
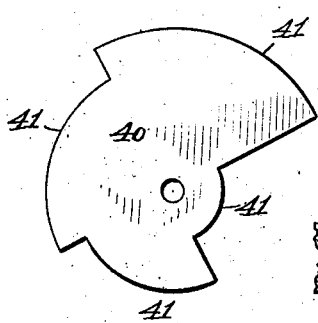
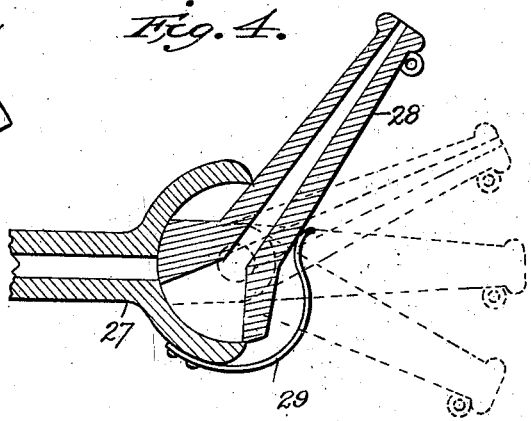
Witnesses
Edwin L. Yewell
Edwin Frey
Inventor
Charles B. Tarbell
by Percy B. Hills
Attorney

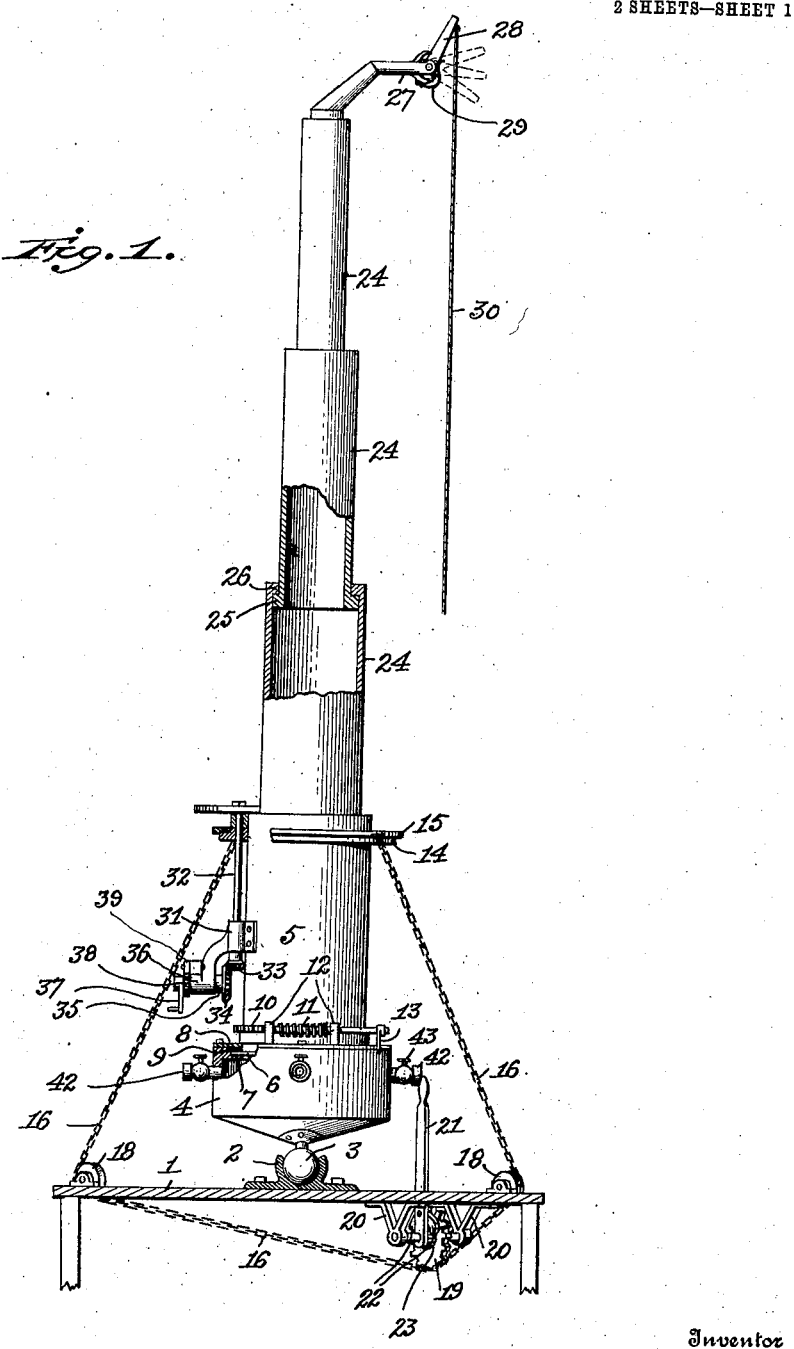

UNITED STATES PATENT OFFICE.

CHARLES B. TARBELL, OF TOMBSTONE, ARIZONA TERRITORY.

EXTENSIBLE WATER-TOWER OR STAND-PIPE.

No. 877,255.　　　　Specification of Letters Patent.　　　　Patented Jan. 21, 1908.

Application filed July 27, 1906. Serial No. 328,084.

To all whom it may concern:

Be it known that I, CHARLES B. TARBELL, a citizen of the United States, residing at Tombstone, in the county of Cochise, Territory of Arizona, have invented new and useful Improvements in Extensible Water-Towers or Stand-Pipes, of which the following is a specification.

My invention relates to extensible water towers or stand pipes for extinguishing fires, and has for its objects to provide certain improvements in the construction of the same, as will be hereinafter more definitely pointed out and claimed, reference being had to the accompanying drawings, in which:

Figure 1 is a side elevation, partly in section, of my improved construction, the same being shown mounted upon a suitable platform or truck for transporting the same. Fig. 2 is a top plan view of the device, the uppermost section of the extensible part being shown in section. Fig. 3 is an enlarged detail plan view of the cam plate for controlling the extension of the telescopic sections of the tower or stand pipe. Fig. 4 is an enlarged detail sectional view of the discharge nozzle.

Similar numerals of reference denote corresponding parts in the several views.

In the said drawings the reference numeral 1 denotes the base or platform upon which my improved device is mounted, the same being intended to be mounted on wheeled trucks, not shown, whereby the device may be transported as a water tower. Fixed centrally upon said platform is the socket 2 of a universal joint, the ball 3 of the same being fixed to the under side of the receiving chamber 4 of the device, whereby said chamber may be adjusted at any angle with respect to said platform.

Fitted into the upper side of chamber 4 is the lowermost section 5 of the telescopic tower, said section 5 having an annular flange 6 at its lower end that rests on a similar flange 7 on the chamber 4, the two being retained together by a collar 8 bolted to the chamber 4, an interposed packing 9 forming a water-tight joint, and yet permitting section 5 to be rotated on chamber 4. As a ready means of rotating section 5 on chamber 4 I have provided on section 5 a toothed ring 10 that is in gear with worm 11 mounted in standards 12 on chamber 4, and operated by a suitable handle 13.

Fixed to the exterior of section 5 at approximately its upper end is a flange 14, and mounted on said flange is a ring 15 free to rotate thereon. Extending downward from said ring 15 are two sprocket chains 16 and 17, the same passing around suitable pulleys 18 located at diagonally opposite corners of the platform 1, and passing thence beneath said platform and in engagement each with a sprocket wheel 19. Said sprocket wheels are similarly operated, and each has its shaft supported in suitable brackets 20 bolted to the under side of platform 1, an operating lever 21 for each of said sprocket wheels being freely mounted on its shaft and carrying oppositely disposed pawls 22 adapted to be engaged with a ratchet wheel 23 fixed to said shaft, whereby said sprocket wheels may be rotated in either direction at will, said rotation being communicated to chains 16 and 17 to tilt the section 5 and chamber 4 on the universal bearing in any direction, whereby the tower may be caused to assume a vertical position under any condition of irregularity of the ground when the truck carrying the device may be stopped.

Nesting within each other are the telescopic sections 24 of the tower, of which I have shown three, though the number may be varied to suit the height to which the water is to be carried. Said sections are maintained against disengagement by any suitable means; for instance, by engaging flanges 25 and 26, and, if desired, said connections may be suitably packed to prevent leakage.

The uppermost of the sections 24 has its upper end 27 bent to a horizontal position and contracted, as shown, and has pivotally mounted at its discharge end a nozzle 28, normally maintained in its uppermost position by a spring 29, in which position the orifice through said nozzle is out of register with the end of the section, and the flow of water thereby cut off, as best seen in Fig. 4. To permit the discharge of water the said nozzle is drawn downward by a suitable cord 30 attached to its outer end, and the volume of the discharge may be regulated by angle of said nozzle, as will be readily understood.

Mounted in a suitable bracket 31 bolted to the section 5 is a vertical rod 32, carrying at its lower end a gear 33 in mesh with a right angle gear 34 mounted on a shaft 35, supported in an extension 36 of bracket 31 and having an operating crank 37 fixed to its outer end, a suitable pawl 38 being provided to engage with a ratchet 39 on said shaft 35 to maintain the parts in any adjusted position. Said rod 32 passes upwardly through the flange 14 on section 5, and carries fixed to its upper end a cam plate 40, formed into a series of irregular cam extensions 41 corresponding in number to the number of extensible sections 24 of the tower, said cam extension being adapted, by the rotation of rod 32 and said cam plate, to successively overlie the upper edges of the sections 24 and thus prevent the projection of all or as many of said sections as may be desired. Thus, by turning said cam plate to the position shown in Fig. 2 with the narrowest of said extensions in proximity to the tower, all of said sections 24 are free to be projected, while, by turning said cam plate so that the next widest extension lies in said position, all but the lowermost of the sections 24 are free to be projected.

Tapped into the side of chamber 4 is a series of coupling cocks 42, provided with cut-off valves 43, to which the engine hose may be connected to supply the water.

From the above description the operation of my improved construction will be understood as follows: When the device is transported to the seat of a conflagration, and, owing to the inequalities in the ground where it is brought to rest, the tower is out of a vertical plane, the same may be readily adjusted to a vertical position by manipulating chains 16 and 17 through levers 21 and sprocket wheels 19. Now, when the hose of one or more engines are connected with the cocks 42 and water pumped into the chamber 4, the filling of the latter and chamber 5 will, through the water pressure, project the sections 24 to their upward limit of movement, the number of said sections to be projected being controlled by the manipulation of cam plate 40 to limit the height of nozzle 28 to the desired degree. To direct the upper end 27 of upper section 24 in the desired direction the worm gear 11 is manipulated, through crank handle 13, whereby section 5 and the sections 24 may be rotated to any position.

While I have described my improved device as mounted on a transportable platform 1, it will be understood that it may be located in a vault in the pavement as a fixed extensible stand pipe, in which event the universal bearing and the adjusting chains 16 and 17 will be dispensed with, and the chamber 5 be a fixed part.

Having thus described my invention, what I claim as new and desire to secure by Letters Patent is:

1. In an extensible water tower or stand pipe, the combination with a series of telescopic sections adapted to be projected by the pressure of the water admitted thereto, of a cam plate, and means for adjusting said cam plate in the path of projection of all or a portion of said sections.

2. In an extensible water tower or stand pipe, the combination with a base section, and a series of telescopic sections mounted in said base section and adapted to be projected therefrom by the pressure of the water admitted thereto, of a cam plate rotatably mounted on said base section, and means for rotating said cam plate to lie in the path of projection of all or a portion of said sections.

3. In an extensible water tower or stand pipe, the combination with a base section, and a series of telescopic sections mounted in said base section and adapted to be projected therefrom by the pressure of the water admitted thereto, of a cam plate rotatably mounted on said base section, means for rotating said cam plate to lie in the path of projection of all or a portion of said sections, and means for retaining said cam plate in any adjusted position.

In testimony whereof, I have hereunto set my hand in the presence of two subscribing witnesses.

CHARLES B. TARBELL.

Witnesses:
F. R. BRANDT,
HANS BERNDT.